United States Patent [19]

Bae

[11] 4,178,282

[45] Dec. 11, 1979

[54] VINYL RESIN STABILIZER

[75] Inventor: Kook J. Bae, East Northport, N.Y.

[73] Assignee: Claremont Polychemical Corporation, Bethpage, N.Y.

[21] Appl. No.: 887,107

[22] Filed: Mar. 16, 1978

[51] Int. Cl.$^2$ .......................... C08K 5/09; C08K 5/52; C08K 5/13

[52] U.S. Cl. ...................... 260/45.75 W; 252/400 A; 252/400 R; 260/23 XA; 260/45.7 PH; 260/45.85 R; 260/45.95 J

[58] Field of Search ........... 260/45.75 W; 252/400 R, 252/400 A

[56] References Cited

U.S. PATENT DOCUMENTS

| | | | |
|---|---|---|---|
| 2,446,976 | 8/1948 | Cousins | 260/45.75 W |
| 2,669,548 | 2/1954 | Darby et al. | 260/45.75 W |
| 3,262,896 | 7/1966 | Ackerman | 260/45.75 W |
| 3,347,823 | 10/1967 | Buckley et al. | 260/45.75 W |
| 3,396,132 | 8/1968 | Perry et al. | 260/45.75 W |
| 3,453,225 | 7/1969 | Pollock | 260/45.75 W |
| 3,454,514 | 7/1969 | Baum | 260/45.75 W |
| 3,558,537 | 1/1971 | Hecker et al. | 260/45.75 W |
| 3,558,539 | 1/1971 | Irish, Jr. | 260/45.75 W |
| 3,759,856 | 9/1973 | Rhodes et al. | 260/23 XA |
| 3,884,872 | 5/1975 | Falconio | 260/45.75 W |
| 3,943,081 | 3/1976 | Brook | 260/45.75 W |
| 3,994,844 | 11/1976 | Rhodes et al. | 260/45.75 W |
| 4,042,549 | 8/1977 | Ahr et al. | 260/23 XA |
| 4,117,029 | 9/1978 | Kitano | 260/45.75 W |

*Primary Examiner*—Harold D. Anderson
*Assistant Examiner*—R. A. White
*Attorney, Agent, or Firm*—E. Janet Berry; Lawrence Rosen

[57] ABSTRACT

This invention comprises novel compositions of matter for use as stabilizers for polyvinyl chloride resins. These compositions comprise alkali metal soap and/or phenolate complexes or solutions (sodium and potassium preferred) and alkaline earth metal soap and/or phenolate complexes or solutions with soluble zinc chloride and hydroxy compounds (or other suitable solutions of zinc chloride) and organophosphites. These combinations of materials have not previously been described as useful for these purposes.

44 Claims, No Drawings

VINYL RESIN STABILIZER

This invention relates to new compositions of matter and more particularly to improved compositions adapted for stabilizing halogenated hydrocarbon polymers against the degradative effects of both heat and light.

More particularly, the present invention relates to new and novel compositions of matter whereby selected chemical compounds, when added to vinyl resin compositions in critical proportions relative to each other, result in a high degree of heat stabilization of the resin which stabilization is far superior to any individual contribution if each of the components were incorporated singly. In other words, it has been found possible to obtain a synergistic effect with respect to heat stabilization.

A major portion of halogen containing vinyl resins being marketed both for consumer and industrial uses are presently stabilized against the degradation effects of heat and/or light by incorporating therein very toxic compositions, solutions and complexes of both barium and cadmium. It has become important to discover and make available equally useful or superior substitute stabilizers of low toxicity. It has been found, for instance that potassium, strontium and zinc complexes can be used satisfactorily to stabilize polyvinyl chloride resins and other halogenated resin compounds against the well-known degradative effects of light and heat. The derivatives of these materials which are employed are of relatively low toxicity.

It is an object of this invention to provide stabilizing agents for halogenated hydrocarbon polymers using alkali metals and alkaline earth metals in combinations with zinc chloride, selected hydroxyl containing compounds.

A further object of the invention is to provide stabilizing agents for halogen-containing vinyl resins which are resistant to sulfur staining.

A still further object of the present invention is to provide stabilizing agents which are useful when used in the presence of fluorescent pigments since these pigments presently require special stabilizing systems.

It has previously been discovered that certain compositions of matter can be incorporated into halogen containing vinyl resins to function as stabilizers. These compositions particularly include compounds of the alkaline earth metals from Group IIA of the Standard Periodic Chart and principally strontium, with liquid complexes produced by combining zinc chloride and certain organic hydroxyl-containing substances, such as 1,3-butylene glycol and organophosphites, such as diphenyl decyl phosphite. This invention is further described in U.S. Pat. No. 3,943,081, issued Mar. 9, 1976.

It is also known that plasticized chloride-containing vinyl resins, for instance, homopolymer polyvinyl chloride, are conventionally stabilized against the degradative effects of heat and light with toxic solutions containing, among other necessary materials, barium and cadmium soaps, salts, phenolates or benzoates, sometimes referred to as "barium-cadmium complexes." Essentially low toxicity stabilizer solutions can be prepared and successfully used in polyvinyl chloride resins having incorporated therein a potassium strontium phenolate-soap complex, a zinc chloride-diol complex, and organophosphites.

The present invention, to be described in detail below, pertains to a related series of chemcial solutions containing solubilized metal compounds, both of the alkali metal and alkaline earth groups, organophosphites, certain hydroxy compounds and certain specific synergistic antioxidants in compatible solvent systems. Thus, the new compositions of matter of the invention comprise certain selected organic acid and phenol compounds of both the alkali metals (Groups IA) and the alkaline earth metals (Group IIA), liquid complexes of zinc chloride with certain organic hydroxyl containing compounds, and organophosphites, preferably with certain specific antioxidants.

To summarize the improvements obtained by use of the present invention, halogen-containing vinyl resins and especially polyvinyl chloride resins are stabilized to both heat and light by addition thereto of potassium and strontium soaps and/or phenolates, with zinc chloride-diol complexes, and organophosphites and preferably with inclusion of one or more selected antioxidants.

The elimination of both cadmium and barium from these vinyl resin stabilizer systems, provides a "low toxicity" stabilizer system having all the required objectives for a stabilizer, e.g., good early color and color control, together with good long term stability, clarity, sulfide stain resistance, ultraviolet light resistance as well as relatively low cost.

The potassium strontium-complexed zinc stabilizer system of the invention, if the metals and phosphite are used in controlled but sufficient quantities to be effective, can be used almost universally and in any application and formulation in which a standard barium-cadmium stabilizer is used, e.g., with or without fillers such as calcium carbonate, in clear polyvinyl chloride resins with all colors and dyes, and in any forming process, such as extrusion, calendering, and plastisol-organosol applications such as coating and dipping.

An outstanding improvement which has thus been achieved in the heat stabilization of polyvinyl chloride by the presently described heat stabilization systems is the general lowering of toxicity of the stabilizer system. The comparison of toxicity as well as the effectiveness between the conventionally used barium-cadmium-zinc-phosphite system, a highly toxic solution, to a relatively low toxicity potassium-strontium-zinc-hydroxyl containing liquid-phosphite solution system is surprising and unexpected.

More specifically, typical ingredients useful in the stabilizing compositions of this invention adapted for use in halogen-containing vinyl resin formulations are the following combinations:

1. Potassium and/or sodium aliphatic carboxylates, phenolates, benzoates, alkyl benzoates or mixed acid compound(s)
2. Strontium, calcium and/or magnesium aliphatic carboxylates, phenolates, benzoates, alkyl benzoates or mixed acid compound(s)
3. Zinc chloride complex or solution of zinc chloride with primary and secondary alcohols, glycols, secondary phosphites, and glycol ethers, substituted triols and glycols
4. Organophosphite(s)
5. Antioxidants
6. Solvents and solubilizing agents for each of the above, both separately and as mixtures, such solvents being generally known and used for incorporating stabilizers into polyvinyl chloride.

As organic acids and phenols for reactants with the alkali metals and alkaline earth metals to form the stabilizers of the invention, there may be used one or more aliphatic or aromatic monocarboxylic acids having at least 6 carbon atoms up to approximately 30 carbon atoms, benzoic acid and aliphatic substituted benzoic acids, half-esters of aliphatic dicarboxylic and tricarboxylic acids in which the ester component is an aliphatic alcohol having at least 4 carbon atoms, phenol, and ring substituted phenols containing one or more aliphatic groups (branched or linear) each of which may contain 6 or more carbon atoms and up to 12 carbon atoms.

The specific organic acids and phenols which can be used in preparing both the alkali metal compounds of (1). above and the alkaline earth metal compounds of (2.) above may be one or more of the following: hexanoic acid, 2-ethyl hexanoic acid, heptanoic acid, octanoic acid, decanoic acid, nonanoic acid, undecylenic acid, undecanoic acid, benzoic acid, para t-butyl benzoic acid, and maleic acid half-esters, as well as phenol, octyl phenol, nonyl phenol, an dodecyl phenol. The organic acid and/or phenol used for the alkali metal and the alkaline earth metal may be the same or different.

The zinc chloride complex or solution (3.) above may be prepared by dissolving zinc chloride in and complexing it with various alcohols, glycols, and other liquid hydroxy materials, such as: ethyl alcohol, propanol, amyl alcohol, isooctyl alcohol, 2-octanol, decyl alcohol, dodecyl alcohol, cyclohexanol, dipropylene glycol, tripropylene glycol, ethylene glycol, propylene glycol, 1,3-butylene glycol, glycerol monoricinoleate, sorbitan monooleate, butyl ricinoleate, butyl lactate, dibutyl maleate, tributyl citrate, glycerol, ethylene glycol monobutyl ether, 2-ethyl-1,3-hexanediol, diphenyl phosphite, phenyldecyl phosphite, didecyl phosphite, di(octylphenyl) phosphite, and other similar secondary phosphites. Thus the type of hydroxy-containing compounds which can be used include the aliphatic alcohols $C_2$ to $C_{15}$, both primary and secondary, aliphatic esters having primary, secondary and tertiary hydroxy groups, alicyclic hydroxy compounds and various polyols, i.e., diols and triols.

The organophosphites which may be used are generally known compounds and include the following di and tri phosphite compounds: triphenyl phosphite, diphenyldecyl phosphite, didecylphenyl phosphite, diphenyloctyl phosphite, diphenyl phosphite, phenyldecylphosphite, tricresyl phosphite, cresyldioctyl phosphite, tris (nonylphenyl) phosphite, trioctyl phosphite, phenyl neopentyl phosphite, and the like.

The antioxidants which are useful for this invention may be phenol derivatives, and sulfur containing organic compounds, which include 2,3-methylene bis (4-ethyl-6-tertiarybutyl phenol), 2,6-ditertiary-butyl-4-methyl phenol (Ionol), diphenylolpropane (Bisphenol A), 4-4'-butylidene bis-(6-tertiary-metacresol), 2,6dioctadecyl-p-cresol, 4-4'thio bis-(6-tertiary butyl-metacresol), 4-4'-sulfonyl diphenol, 4,4'-thio diphenol, 2,5-dihydrothiophene, 1,1-dioxide (butadiene sulfone) phenyl sulfoxide, dimethyl thiodipropionate, isooctyl mercaptopropionate, dilauryl thiopropionate, isooctyl thioglycolate, dibenzothiophene sulfone, and the like.

The solvents and solubilizing agents used for dissolving each of the ingredients, and also keeping them in solution, are generally the same or similar to those which are in use, namely mineral spirits, naphtha, mineral oil, and heavy petroleum oil fractions, the solvating agents being of a proprietary nature but including such solvents as octyl alcohol.

Certain useful and preferred ranges and proportions of ingredients have been established by a study of the various materials used in the stabilizer composition of the invention. These ranges may be summarized as follows:

|  | Useful Amts Range, phr. | Preferred Amts Range, phr. |
| --- | --- | --- |
| K, Na in form of aliphatic carboxylate, phenolate, benzoate, alkylated acid or phenolate, or mixed acid compounds. | 0.005 to 0.10 | 0.008 to 0.05 |
| Sr, Ca, Mg in form of aliphatic carboxylate, phenolate, benzoate, alkylated acid or phenolate, or mixed acid compounds. | 0.05 to 0.3 | 0.08 to 0.15 |
| $ZnCl_2$ | 0.005 to 0.30 | 0.03 to 0.1 |
| Alcohol, glycol, polyhydroxy or other OH compound used to dissolve and complex the zinc chloride. | 0.01 to 10. | 0.06 to 0.4 |
| Secondary and tertiary organic-phosphite esters | 0.00 to 5.0 | 0.2 to 1.0 |
| Antioxidants | as necessary | as necessary |
| Solvents and solubilizing agents | as necessary | as necessary |

|  | Useful Wt. Ratio | Preferred Wt. Ratio |
| --- | --- | --- |
| Potassium/Strontium | 0.02 to 0.2 | 0.06 to 0.12 |
| Strontium/$ZnCl_2$ | 2.0 to 10.0 | 3.0 to 6.5 |
| $ZnCl_2$/(OH) cmpd. | 0.06 to 0.3 | 0.1 to 0.25 |

In general and for best results, it is best to prepare the stabilizers of the invention using the aforesaid ingredients within these ranges.

Also, it is necessary that an epoxy oil such as epoxidized soyabean oil or epoxydized ester, or liquid epoxy resin be included with the stabilizers of the present invention in order to obtain optimum heat stability.

The described stabilizers of this invention can be used in polyvinyl halide resins, both homopolymers and copolymers of the vinyl halide with certain other monomers such as methyl methacrylate, butyl acrylate, acrylonitrile, styrene, α-methylstyrene, and other vinyl monomers, including vinyl acetate, propylene and ethylene.

The principal polymer used in connection with the present invention is, of course, polyvinyl chloride. However, other halogen-containing polymers such as polyvinylidene chloride, chlorinated polyethylene and chlorinated polypropylene can be successfully stabilized with the zinc chloride containing compositions of the invention.

Stabilizers of the type described are used to inhibit successive dehydrohalogenation and subsequent oxidation of the resulting polyene chain such that six or more conjugated double bonds may form in the absence of said stabilizers, or those presently used such as the commonly used barium nonylphenate/cadmium carboxylate/zinc carboxylate and mixed alkyl-aryl phosphites, or others such as the calcium/zinc carboxylates, the mono- and dialkyl tin carboxylates or mercaptoesters, or the lead compounds such as basic lead sulfate or phthalate.

Polyvinyl chloride homopolymer or vinyl copolymers can be formed in various known ways, among which are suspension, emulsion, and mass or bulk polymerization procedures. Both suspension and mass polymerization methods produce polyvinyl chloride used in the calendering, extrusion and molding of both flexible, semi-rigid and rigid polyvinyl chloride, whereas polyvinyl chloride resin produced via the emulsion route is used to make plastisol and organosol pastes which are used in dip, roller and spread coating, along with rotational coating procedures and in vinyl inks.

It is in the high heat processing of homopolymer polyvinyl chloride or copolymers during which the heat stabilizers are required, simply to slow down the various degradation steps which degrade polyvinyl chloride or other polymers containing halogens, which cause color drift, early darkening, embrittlement and other undesirable characteristics.

It is also known that the use of standard commercial proprietary heat stabilizers can cause other undesirable effects, such as clarity loss, plate-out on calendering rolls and molding equipment, and other incompatability effects such as migration to the surface. The standard stabilizers are usually designed and compounded to minimize these undesirable effects.

Polyvinyl chloride, being a halogen-containing polymer, is not particularly resistant to ultraviolet light, such as from the rays of the sun. Certain stabilizers, such as the mercaptoesters of alkyltin cause UV light to attack polyvinyl chloride even more rapidly. Again, the barium-cadmium and barium-cadmium-zinc stabilizers of today's technology are made to maximize resistance to sunlight when desirable to do so.

Heat stabilizers are used as liquids, powders or pastes. The liquids can contain 100% active ingredients, as is the case of the alkyltin products, or may contain diluents as in the case of the common barium-cadmium type of products. Powders and pastes are generally 100% active. The less-than 100% active barium-cadmium and barium-cadmium-zinc stabilizer liquids of the prior art are dissolved in a system of high boiling liquids, among which are mineral spirits, naphtha and isooctyl alcohol. The stabilizers of the present invention can also make use of the same solvents and solvent systems, but also can make use of other, less common solvents such as high boiling glycols and many proprietary solvent systems.

TEST PROCEDURES

The polyvinyl chloride formulation which was used in the Examples of the invention was as follows:

| Ingredients | Parts by Weight |
| --- | --- |
| Vinyl chloride homopolymer (PVC) | 100.0 |
| Di(2-ethylhexyl) phthalate (DOP) | 40.0 |
| Epoxidized soyabean oil (ESO) | 5.0 |
| Calcium carbonate filler (trade name Atomite) | 25.0 |
| Stearic Acid (lubricant) | 0.5 |
| Stabilizer solution | 3.0 |

To evaluate both positive and negative aspects of various stabilizer combinations, the PVC compounds prepared according to the Test Procedures and Examples were processed by milling on an open two-roll laboratory mill at 330° F. at a roll gap of about 0.025–0.030 inch for a period of 5 minutes, the sheet obtained taken off the mill at 0.025 inch thickness. Six one-square inch chips (or smaller size) were cut from the above sheets, placed on a glass plate, then heat-aged in an air-circulating oven at 400° F. for varying periods of time to study resistance to degradation. Samples were removed from the oven every 10 minutes for up to one hour. During heat exposure, the degradation of the chips was noted as demonstrated by a darkening in color, the more efficient stabilizers furnishing the best color retention (high degradation resistance) and the longest stability until ultimate degradation results after prolonged periods of testing time.

Clarity tests were performed on a similar PVC formulation, but without the filler present. The test involved the preparation of a compression molded plaque of 0.100 inch thickness prepared between two mirror-polished plates. Results were obtained by visually observing the differences in clarity.

Another test used was a mill stability test in which the sheet was allowed to remain on the 330° F. mill until sticking on the mill surface was noted and/or a considerable darkening in color was obtained.

Another test used was the Brabender Plastograph torque rheometer evaluation. This test has become a standard in the PVC industry for the determination of melt rheology and dynamic stability. To carry out this test, a 55.0 gram charge of the aforementioned milled PVC sheet was added, in strips, to a 60 ml. bowl preheated to 370° F., the bowl containing two rotors, rotating in opposite directions and at slightly different speeds (similar to a miniature Banbury mixer, used in commercial operations), and averaging about 70 RPM. The stability and rheology of the samples were followed by removing small ¼"×¼" chips using a pair of duck-billed pliers. Both color degradation and time period to ultimate degradation, as noted by a sudden increase in viscosity, are easily obtained in this manner.

The following examples are presented solely to illustrate the various embodiments of the invention, but are intended in no way to restrict the scope of the invention to these examples. The parts and percentages set forth in the Test Procedures and Examples are by weight.

EXAMPLE 1

30.5% Potassium 2-Ethylhexoate

Into 2,000 ml 3-neck round-bottomed flask equipped with a stirrer, thermometer, Dean-Stark water trap, water-cooled condenser and heating mantle there were added the following ingredients:

| Compound | Parts by Weight |
| --- | --- |
| High-flash naphtha | 342.0 |
| i-Decyl alcohol | 178.0 |
| 2-Ethylhexoic acid | 196.0 |
| Potassium hydroxide | 76.0 |

The above materials were combined, mixed and reacted with heating at 200°–210° F. initially at atmospheric pressure. When the temperature reached 220°–250° F. vacuum was applied to remove the water. The final product was a pale yellow to orange liquid having potassium assay of 6.2%. The preparation required six hours total reaction time.

EXAMPLE 2

A. 58% Strontium 2-ethyl-hexoate/nonyl Phenate

Into a 2,000 ml 3-neck round-bottomed flask, equipped with a stirrer, thermometer, Dean-Stark water trap, water-cooled condenser and heating mantel there were added the following ingredients:

| Compound | Parts by Weight |
|---|---|
| High-flash naphtha | 258.0 |
| Tripropylene glycol | 90.0 |
| iso-Decyl alcohol | 50.0 |
| Nonylphenol | 289.0 |
| 2-Ethylhexoic acid | 182.0 |
| Strontium octahydrate | 344.0 |

The active ingredients reacted at 200°–250° F. by stripping water off (about 235 ml water was taken in this reaction).

Final product was viscous orange liquid with a strontium content of 11.0%. It was found that a maximum of 14.0% strontium was obtained by this reaction.

Other materials can be made by a similar procedure as that described in Example 1 above. Alternate materials made in this manner include:

B. 51.5% Lithium neo-Decanoate

| Compound | Parts by Weight |
|---|---|
| Mineral spirits | 365.0 |
| Neo-decanoic acid | 386.0 |
| Lithium hydroxide | 39.0 |
| Reaction temperature: 210° F.–230° F. | |
| Active lithium: 2.0% | |

C. 29.8% Sodium 2-Ethylhexoate

| Compound | Parts by Weight |
|---|---|
| High-flash naphtha | 360.0 |
| Mineral spirits | 250.0 |
| i-Decyl alcohol | 100.0 |
| 2-ethylhexoic | 250.0 |
| Sodium hydroxide | 70.0 |
| Reaction temperature: 220° F.–240° F. | |
| Active sodium: 4.1% | |

D. 74.5% Magnesium 2-Ethylhexoate/Nonylphenate

| Compound | Parts by Weight |
|---|---|
| High-flash Naphtha | 162.0 |
| Tripropylene Glycol | 40.0 |
| Nonylphenol | 325.0 |
| 2-Ethylhexoic acid | 213.0 |
| Magnesium Hydroxide | 86.0 |
| Active magnesium: 4.0% | |

E. 61.20% Calcium Neodecanoate/Nonylphenate

| Compound | Parts by Weight |
|---|---|
| High-flash naphtha | 231.0 |
| Tripropylene glycol | 42.0 |
| Nonylphenol | 234.0 |
| Neo-decanoic acid | 154.0 |
| Calcium hydroxide | 79.0 |
| Active calcium: 6.0% | |

EXAMPLE 3

22% Zinc Chloride Solution

Into a 2,000 ml beaker there is placed 700 gms of 1,3-butylene glycol. The beaker and contents warmed to 80°–90° C. and there is slowly added 200 gms to technical grade zinc chloride with mixing. Mixing is continued for about 2 hours or until all the zinc chloride has formed the solution and the reactants remain liquid. At the end of the reaction, the percent of active zinc in the solution was 10.4% (theoretical % Zn=10.65).

Zinc chloride-secondary phosphite solutions were obtained by this procedure (% Zn=11.0%).

EXAMPLE 4

Use of Samples from Examples 1, 2, and 3 vs. Ba/Cd Stabilizer Solution

A series of polyvinyl chloride compounds was prepared using the formulation described in the Test Procedures and the various individual stabilizer solutions prepared as shown below. The results are shown in Tables 1A and 1B for each stabilizer.

| | Various Combinations of Low Toxicity Stabilizers % by Weight | | | | | | | | |
|---|---|---|---|---|---|---|---|---|---|
| COMPONENTS | A | B | C | D | E | F | G | H | I |
| Barium-2-ethylhexoate/nonylphenate Ba = 13.0% | 47.0 | 26.5 | 35.0 | — | — | — | — | — | — |
| Potassium 2-ethylhexoate, K = 6.3% | — | — | — | — | 2.0 | 4.5 | 4.5 | — | 4.5 |
| Strontium 2-ethylhexoate/nonylphenate Sr = 11.0% | — | — | — | 34.0 | 34.0 | 34.0 | 34.0 | 34.0 | 34.0 |
| Cadmium 2-ethylhexoate, Cd = 15.0% | 10.0 | 8.0 | 11.6 | — | — | — | — | — | — |
| $ZnCl_2$/Secondary phosphite, Zn = 11.8% | — | — | — | 9.0 | 9.0 | 9.0 | 9.0 | 9.0 | 9.0 |
| Zinc 2-ethylhexoate, Zn = 14.3% | 1.0 | 3.0 | 4.5 | — | — | — | — | — | — |
| Triphenyl phosphite | 11.0 | — | — | — | — | — | 15.0 | — | — |
| Diphenyldecyl phosphite | 13.0 | — | — | — | — | — | 20.0 | — | — |
| Didecylphenyl phosphite | — | 18.0 | 10.4 | 35.0 | 35.0 | 35.0 | — | 35.0 | 35.0 |
| iso-Decyl alcohol | — | — | — | 5.5 | 5.5 | 5.5 | 5.5 | 5.5 | 5.5 |
| Mineral spirits | 18.0 | 44.5 | 37.5 | 9.5 | 7.5 | 5.0 | 5.0 | 16.5 | 12.0 |
| Ionol, antioxidants | — | — | 1.0 | 7.0 | 7.0 | 7.0 | 7.0 | — | — |
| Results: PVC sheet color oven-degraded chip colors | 2+ | 2 | 2 | 2 | 2 | 2 | 2+ | 2 | 2 |
| 10 min. | 3 | 3 | 3 | 3 | 3– | 3 | 3+ | 3 | 3+ |
| 20 min. | 5 | 4 | 4 | 3+ | 3 | 3 | 4 | 3 | 4 |
| 30 min. | 6 | 4 | 4 | 4 | 4 | 4 | 5 | 4 | 5 |
| 40 min. | 7 | 5 | 5 | 6 | 5 | 5 | 5 | 6– | 6 |
| 50 min. | 8 | 6 | 6 | 9 | 6 | 6 | 6 | 9 | 7 |
| 60 min. | 8 | 9 | 10 | 15 | 10 | 9 | 9 | 15 | 9 |

| | Various Combinations of Low Toxicity Stabilizers % by Weight | | | | | | | |
|---|---|---|---|---|---|---|---|---|
| COMPONENTS | A | B | C | D | E | F | G | H |
| Lithium neodecanoate, Li = 2.0% | 2.0 | — | — | — | 3.0 | — | — | 3.0 |
| Sodium 2-ethylhexoate, Na = 4.1% | — | 2.0 | 2.0 | 3.0 | — | — | 5.0 | — |
| Potassium 2-ethylhexoate, K = 6.3% | 3.0 | 3.0 | 2.0 | — | — | 5.0 | — | — |
| Magnesium 2-ethylhexoate/nonylphenate, Mg = 4.0% | — | — | 5.0 | — | — | 10.0 | — | 5.0 |
| Calcium neodecanoate/nonylphenate, Ca = 6.0% | — | 5.0 | — | 5.0 | 5.0 | 20.0 | 10.0 | — |
| Strontium 2-ethylhexoate/nonylphenate, Sr = 11.0% | 35.0 | 30.0 | 30.0 | 30.0 | 30.0 | — | 25.0 | 30.0 |
| ZnCl$_2$/Secondary phosphite, Zn = 11.8% | 9.0 | 9.0 | 9.0 | 9.0 | 9.0 | 9.0 | 9.0 | 9.0 |
| Triphenyl phosphite | — | 10.0 | 10.0 | 40.0 | — | — | — | — |
| Diphenyldecyl phosphite | 10.0 | — | — | — | — | — | 35.0 | — |
| Didecylphenyl phosphite | 25.0 | 28.0 | 28.0 | — | 40.0 | 40.0 | — | 40.0 |
| Isodecyl alcohol | 6.0 | 6.0 | 7.0 | 6.0 | 6.0 | 5.0 | 4.0 | 6.0 |
| Mineral spirits | 5.0 | — | — | — | — | 4.0 | 5.0 | — |
| Ionol, antioxidants | 5.0 | 7.0 | 7.0 | 7.0 | 7.0 | 7.0 | 7.0 | 7.0 |

| Color Legend (Opaque) | |
|---|---|
| 1: White | 6: Yellow to Light Orange |
| 2: Off-White | 7: Dark Yellow |
| 3: Faint Yellow | 8: Light Brownish Orange |
| 4: Light Yellow | 9: Dark Yellow with Black Edge |
| 5: Yellow | 10: Light Brown with Black Edge |
| | 15: Dark Brown with Black Edge |

These experimental results and comparative data clearly show that the stabilizers which contain both potassium and strontium soap and/or phenate samples (No. F and G) are better for long term oven stability than is No. D which contains only strontium soap and/or phenate.

It is also clearly indicated that the novel stabilizers in Samples No. F and G are equivalent or slightly better in their effect on PVC degradation as compared with the relatively standard well-known Ba/Cd system stabilizers of Samples No. A, B and C.

By comparing Sample I with Sample No. H, it becomes obvious that Sample No. I is better (by about 30%) than Sample No. H for long term oven stability which means that the potassium octoate has a synergistic effect with the other components.

EXAMPLE 5

Dynamic Mill Stability Test

One of the well-known standard Ba/Cd/Zn system stabilizers and one Sr/K/ZnCl$_2$ complex stabilizer were prepared for mill stability test. The mill temperature on the surface was 335° F. The same PVC formulation was used for this test as the formulation described above. The results are shown below in Table 2.

TABLE 2

| COMPONENTS | % by Weight | A | B |
|---|---|---|---|
| Ba 2-ethylhexoate/nonylphenate solution | 13.0% | 37.0 | — |
| Cd 2-ethylhexoate solution | 15.0% | 12.0 | — |
| Zn 2-ethylhexoate solution | 14.3% | 4.0 | — |
| Sr 2-ethylhexoate/nonylphenate solution | 11.0% | — | 35.0 |
| K 2-ethylhexoate solution | 6.0% | — | 3.0 |
| ZnCl$_2$ solution | 11.8% | — | 9.0 |

TABLE 2-continued

| | | |
|---|---|---|
| Didecylphenyl phosphite | 12.0 | 35.0 |
| Antioxidant (Ionol) | 1.0 | 7.0 |
| Isodecyl alcohol | — | 6.0 |
| Mineral spirits | 34.0 | 5.0 |

| RESULTS | MILL STABILITY COLOR (CHIPS) | |
|---|---|---|
| After | A | B |
| 5 min. | 2 | 2 |
| 15 min. | 3 | 2 |
| 30 min. | 3 | 3 |
| 45 min. | 4 | 3 |
| 60 min. | 4 | 3 |
| 75 min. | 4 | 4 |
| 90 min. | 5 | 4 |
| 105 min. | 5 | 4 |
| 120 min. | 5 | 4 |
| COLOR LEGEND (OPAQUE) | | |
| 1: white | 5: yellow | |
| 2: off-white | 6: yellow to tan | |
| 3: faint yellow | 7: dark yellow-tan | |
| 4: light yellow | 8: light brown | |

These dynamic mill stability results show that the novel potassium-containing Sr/ZnCl$_2$ solution of the invention is quite satisfactory in stability as compared to the standard Ba/Cd/Zn stabilizer systems.

EXAMPLE 6

BRABENDER TEST

No. A and B stabilizers of Example 5 were used for this Brabender test. The results are shown in Table 3 below.

The Brabender conditions were:
1. Temperature = 370° F./3 zones
2. 60 R.P.M.
3. Chip taken every 5 min.
4. Charged 55 gms within 2 min.
5. p = 1, f = 1

TABLE 3

| RESULT | BRABENDER COLOR (CHIPS) | |
|---|---|---|
| After | A | B |
| 5 min. | 2 | 2 |
| 10 min. | 2 | 2 |
| 15 min. | 3 | 2 |
| 20 min. | 3 | 3 |
| 25 min. | 3 | 3 |
| 30 min. | 4 | 4 |
| 35 min. | 5 | 4 |
| 40 min. | 6 | 5 |

TABLE 3-continued

| RESULT | BRABENDER COLOR (CHIPS) | |
|---|---|---|
| After | A | B |
| 45 min. | 7 | 5 |
| 50 min. | 8D | 6 |
| 60 min. | — | 7 |
| 65 min. | — | 8D |

Color legend = same as shown in Example 5.
D = Degradation

These results are unexpected and surprising in that they clearly show that the Sr/K/ZnCl$_2$ stabilizer is superior to a Ba/Cd/Zn system as represented by data from Sample A above. Sample A degraded at 50 min., but Sample B which contains the K/Sr/ZnCl$_2$ stabilizer degraded at 65 min.

EXAMPLE 7

Zinc Chloride Solutions Prepared with Hydroxy Materials other than 1,3-Butylene Glycol and Organo Phosphites The compound in Example 3 was prepared from zinc chloride, 1,3-butylene glycol and secondary phosphite, and the stabilizer Samples of Example 4.

Example 4 and Example 5 were repeated using this solution. Studies were then conducted on the use of hydroxyl containing materials other than 1,3-butylene glycol.

The following materials were used to dissolve the zinc chloride, and the solutions obtained were then used to prepare polyvinyl chloride resin stabilizers similar to the preparation of Example 4 as shown above.

a. 1,3-butylene glycol, 12% Zn
b. isooctyl alcohol, 11.8% Zn
c. ethylene glycol monobutyl ether (butyl cellosolve) 13.8% Zn
d. diphenyl phosphite, 11.6% Zn
e. phenylisodecyl phosphite, 6.8% Zn
f. mixed dodecyl-tetradecyl alcohols (Alfol 1214), 10.6% Zn In like manner, other hydroxyl-containing organic reagents are useful to dissolve zinc chloride; these compounds include without limitation:

2-octanol
butyl ricinoleate
butyl lactate
butyl maleate
tributyl citrate
cyclohexanol
glycerol

EXAMPLE 8

Use of Zinc Salts Other Than Zinc Chloride

Stabilizers were also prepared using zinc salts other than zinc chloride, both zinc bromide and zinc nitrate were used and each were tested against the one prepared as above using zinc chloride. Butylene glycol-1,3 was used as the solvent for the zinc salt in each case. The approximate limiting concentration of the zinc was found to be highest for the chloride (12%), lowest for the nitrate (7.2%), and intermediate for the bromide (9.1%), this variation showing the relative complexing strength of the salts. The individual stabilizer solutions which were obtained however, each contained the same amount of zinc (1.09%), the salt solution being prepared in similar manner to that of Example 1. The other materials used in preparing the stabilizers were:

| COMPOUND | % by Weight |
|---|---|
| Strontium solution of Example 2 | 24.3 |
| Nonylphenol | 10.0 |
| Diphenyldecyl Phosphite | 24.0 |
| Solvents, other than 1,3-butylene glycol | 32.6 with Zn chloride |
| | 29.8 with Zn bromide |
| | 27.6 with Zn nitrate |

The evaluations in polyvinyl chloride homopolymer resin were run in the same system as described in the Test Procedures above with the exception that no calcium carbonate filler was used, and the colors obtained were compared with the Gardner color scale, Series 1953, with a 0 rating being colorless, 5 being light yellow, 10 being orange-yellow, 18 being dark reddish-orange, and 20 being totally black.

The oven test temperature was 380° F., and a set of test pieces was removed every 10 minutes. The results are shown in Table 4 below.

TABLE 4

| | Chloride | Bromide | Nitrate |
|---|---|---|---|
| Color of pressed plaque | 2 | 3 | 3 |
| Clarity of pressed plaque against white light and black paper | Clear | Clear | Clear |
| Oven results: color after: | | | |
| 10 min | 1 | 4 | 2 |
| 20 min | 2 | 5 | 4 |
| 30 min | 4 | 6 | 6 |
| 40 min | 9 | 20 | 8 |
| 50 min | 20 | 20 | 10 |

From these experiments it can be seen that the bromide is somewhat inferior to the chloride. The nitrate also gave poorer color results but may be useful as a possible zinc source in the stabilizers of the invention since its long term stability was found to be superior.

It was also found that zinc fluoride was not useful in a similar manner as it did not dissolve in the glycol. It was found that when tested as a solid it gave poorer results as to color than did the bromide. It also gave poor clarity results against a background of white light.

What is claimed is:

1. A stabilizer composition especially adapted for use as a stabilizer for halogenated hydrocarbon resins which comprises at least one alkali metal salt of an organic acidic compound selected from the group consisting of carboxylic acids and phenols, at least one alkaline earth metal salt of an organic acidic compound selected from the group consisting of carboxylic acids and phenols, zinc chloride dissolved in an organic hydroxyl containing compound or an organic diphosphite, at least one organophosphite, and at least one inert organic solvent therefor.

2. The stabilizer composition of claim 1 in which the alkali metal salt is a potassium salt.

3. The stabilizer composition of claim 1, in which the alkali metal salt is a lithium salt.

4. The stabilizer composition of claim 1 in which the alkali metal salt is a sodium salt.

5. The stabilizer composition of claim 1 in which the alkaline earth metal salt is a strontium salt.

6. The stabilizer composition of claim 1 in which the alkaline earth metal salt is a calcium salt.

7. The stabilizer composition of claim 1 in which the alkaline earth metal salt is a magnesium salt.

8. The stabilizer composition of claim 1 in which the organic acidic compound is an aliphatic acid.

9. The stabilizer composition of claim 1 in which the organic acid compound is a phenol.

10. The stabilizer composition of claim 1 in which the organic acid compound is a mixture of at least one aliphatic acid and at least one phenol.

11. The stabilizer composition of claim 1 in which the zinc chloride is dissolved in an aliphatic alcohol.

12. The stabilizer composition of claim 1 in which the zinc chloride is dissolved in a dihydroxyl compound.

13. The stabilizer composition of claim 1 in which the zinc chloride is dissolved in an organic diphosphite.

14. The stabilizer composition of claim 1 in which the zinc chloride is dissolved in a glycol ether.

15. The stabilizer composition of claim 1 in which the organophosphite is a diphosphite.

16. The stabilizer composition of claim 1 in which the organophosphite is a triphosphite.

17. The stabilizer composition of claim 1 in which the alkaline earth metal salt is a strontium salt of an aliphatic acid, and the zinc chloride is dissolved in an aliphatic hydroxyl compound.

18. A stabilized vinyl chloride resin composition which has incorporated therein at least one alkali metal salt of an organic acidic compound selected from the group consisting of carboxylic acids and phenols, at least one alkaline earth metal salt of an organic acidic compound selected from the group consisting of carboxylic acids and phenols, zinc chloride, an organic hydroxyl containing compound and at least one organophosphite.

19. The stabilized vinyl chloride resin of claim 18 in which the vinyl chloride resin is a vinyl chloride homopolymer.

20. The stabilized vinyl chloride resin chloride resin of claim 18 in which the vinyl chloride resin is a vinyl chloride copolymer.

21. The stabilized vinyl chloride resin of claim 18 in which the alkali metal salt is a potassium salt.

22. The stabilized vinyl chloride resin of claim 18 in which the alkali metal salt is a lithium salt.

23. The stabilized vinyl chloride resin of claim 18 in which the alkali metal salt is a sodium salt.

24. The stabilized vinyl chloride resin of claim 18 in which the alkaline earth metal salt is a strontium salt.

25. The stabilized vinyl chloride resin of claim 18 in which the alkaline earth metal salt is a calcium salt.

26. The stabilized vinyl chloride resin of claim 18 in which the alkaline earth metal salt is a magnesium salt.

27. The stabilized vinyl chloride resin of claim 18 in which the aliphatic organic hydroxyl-containing compound is an aliphatic alcohol.

28. The stabilized vinyl chloride resin of claim 18 in which the aliphatic organic hydroxyl-containing compound is a diol.

29. The stabilized vinyl chloride resin of claim 18 in which the aliphatic organic hydroxyl-containing compound is a glycol ether.

30. The stabilized vinyl chloride resin of claim 18 in which at least one of the organophosphites is a diphosphite.

31. The stabilized vinyl chloride resin of claim 18 in which at least one of the organophosphites is a triphosphite.

32. A stabilizer composition for vinyl chloride resins which comprises a potassium salt of a carboxylic acid, a strontium salt of a phenol, zinc chloride dissolved in an organic hydroxyl-containing compound, at least one organophosphite and at least one inert, non-reactive-organic solvent therefor, the potassium to strontium ratio in the composition being from about 0.02 to about 0.2, the strontium to zinc chloride ratio in the composition being from about 2.0 to about 10.0, and the zinc chloride to hydroxyl-containing compound ratio being from about 0.06 to about 0.3.

33. A method of light and heat stabilization for vinyl chloride resins which comprises incorporating therein a composition consisting essentially of at least one alkali metal salt of an organic acidic compound selected from the group consisting of carboxylic acids and phenols, at least one alkaline earth metal salt of an organic acidic compound selected from the group consisting of carboxylic acids and phenols, zinc chloride dissolved in an organic hydroxyl containing compound, at least one organophosphite, and at least one inert, non-reactive solvent.

34. The method of light and heat stabilization for vinyl chloride resins of claim 33 in which the alkali metal salt is a potassium salt.

35. The method of light and heat stabilization for vinyl chloride resins of claim 33 in which the alkali metal salt is a sodium salt.

36. The method of light and heat stabilization for vinyl chloride resins of claim 33 in which the alkali metal salt is a lithium salt.

37. The method of light and heat stabilization for vinyl chloride resins of claim 33 in which the alkaline earth metal salt is a strontium salt.

38. The method of light and heat stabilization for vinyl chloride resins of claim 33 in which the alkaline earth metal salt is a calcium salt.

39. The method of light and heat stabilization for vinyl chloride resins of claim 33 in which the alkaline earth metal salt is a magnesium salt.

40. The method of light and heat stabilization for vinyl chloride resins of claim 33 in which the organic hydroxyl containing compound is an aliphatic alcohol.

41. The method of light and heat stabilization for vinyl chloride resins of claim 33 in which the organic hydroxyl containing compound is a diol.

42. The method of light and heat stabilization for vinyl chloride resins of claim 33 in which the organic hydroxyl containing compound is a glycol ether.

43. The method of light and heat stabilization for vinyl chloride resins of claim 33 in which the organophosphite is a diphosphite.

44. The method of light and heat stabilization for vinyl chloride resins of claim 33 in which the organophosphite is a triphosphite.

* * * * *